US006970965B2

(12) United States Patent
Kang et al.

(10) Patent No.: US 6,970,965 B2
(45) Date of Patent: Nov. 29, 2005

(54) BASE SYSTEM FOR BUS CONNECTION WITH DOCKING SYSTEM AND METHOD FOR CONTROLLING THE SAME

(75) Inventors: Seoung Cheol Kang, Osan-si (KR); Do Gwang Rha, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 10/216,888

(22) Filed: Aug. 13, 2002

(65) Prior Publication Data
US 2003/0101305 A1 May 29, 2003

(30) Foreign Application Priority Data
Oct. 22, 2001 (KR) .............. 2001-65072

(51) Int. Cl.[7] .............. G06F 13/00; G06F 3/00
(52) U.S. Cl. .............. 710/304; 710/313
(58) Field of Search .............. 710/62, 72, 301–304, 710/313; 713/502; 709/245; 361/683, 686, 361/727; 439/377

(56) References Cited
U.S. PATENT DOCUMENTS

| 5,187,645 A | * | 2/1993 | Spalding et al. | 361/686 |
| 5,310,358 A | * | 5/1994 | Johnson et al. | 439/358 |
| 5,586,332 A | * | 12/1996 | Jain et al. | 713/322 |
| 5,632,020 A | * | 5/1997 | Gephardt et al. | 710/304 |
| 6,119,237 A | * | 9/2000 | Cho | 713/300 |
| 6,519,669 B1 | * | 2/2003 | Yanagisawa | 710/304 |
| 6,701,417 B2 | * | 3/2004 | Chaudhry et al. | 711/141 |

FOREIGN PATENT DOCUMENTS

| CN | 1291748 A | 4/2001 |
| JP | 11312139 | 11/1999 |

OTHER PUBLICATIONS

"The Network Vehicle-a glimpse into the future of mobile multi-media" by Lind, R.; Schumacher, R.; Reger, R.; Olney, R.; Yen, H.; Laur, M.; Freeman, R. (abstract only) Publication Date: Sep. 1999.*

* cited by examiner

Primary Examiner—Gopal C. Ray
(74) Attorney, Agent, or Firm—Fleshner & Kim, LLP

(57) ABSTRACT

A base system for bus connection with a docking system and a method for controlling the same. The base system can include a docking connection processing circuit and a docking switch. The docking connection processing circuit detects connection of at least one docking system to the base system, generates a bus cycle in the base system of a type different from that of a bus cycle used in the docking system and outputs a docking bus connection enable signal within a period of time for which the bus cycle of the different type is generated. The docking switch couples a bus of the docking system to a bus of the base system in response to the docking bus connection enable signal from the docking connection processing circuit. The base system is easily coupled with an external system for function expansion.

31 Claims, 5 Drawing Sheets

*RELATED ART*

BASE SYSTEM FOR BUS CONNECTION WITH DOCKING SYSTEM AND METHOD FOR CONTROLLING THE SAME

BACKGROUND OF THE INVENTION

1. Field of the Invention

The present invention relates to a base system for bus connection with a docking system and a method for controlling the same.

2. Background of the Related Art

As well known to those skilled in the art, a portable terminal that uses battery power for system power such as a personal digital assistant (PDA), an international mobile telecommunications (IMT)-2000 terminal, a personal communication service (PCS) terminal, personal computer and so forth, includes a plurality of devices. The plurality of devices can include, for example, a central processing unit (CPU), a random access memory (RAM), an audio module, a liquid crystal display (LCD) module, a communication module, etc.

The portable terminal (hereafter "base system") further includes at least one expansion unit for function expansion through which an external system (hereafter "docking system") can be docked to the base system as needed. The docking system is typically dockable to the base system via a bus interface predefined by a hardware logic, for example, an industry standard architecture (ISA) bus interface or a peripheral component interconnect (PCI) bus interface.

However, conflicts between the docking system and the base system when establishing an interface for functional expansion of the base system can prevent the interface and cause base system hang-ups. Accordingly, attempts to establish the interface must be repeated which reduce the base system availability and increase operator inconvenience.

FIG. 1 is a block diagram showing construction of a related art base system for improving bus connection with a docking system. As shown in FIG. 1, the base system 100 is connected with the docking system 150 via a docking PCI bus interface. The base system 100 includes a PCI bus controller 110, a PCI bus idle state detector 120 and a docking switch 130.

The PCI bus controller 110 recognizes a docking detection signal generated because of connection of the docking system 150 to the base system 100, and provides a PCI bus ready signal to the PCI bus idle state detector 120. In response to the PCI bus ready signal from the PCI bus controller 110, the PCI bus idle state detector 120 checks whether a PCI bus is currently in an idle state, and provides a docking PCI bus connection enable signal to the docking switch 130 if the PCI bus is in the idle state.

The docking switch 130 performs a switching operation in response to the PCI bus connection enable signal from the PCI bus idle state detector 120 to carry out the bus connection-based docking between the docking system 150 and the PCI bus controller 110 in the base system 100.

However, to accurately check the idle state of the PCI bus, which is an essential element for the docking between the related art base system and the docking system, the base system must have a hardware module for operating the base system at a higher speed than a clock frequency (i.e., 33 Khz) at which the PCI bus is operated, namely, a logic for checking the idle state of the PCI bus. The hardware module results in an increase in installation cost. Moreover, because the PCI bus instantaneously enters the idle state on an irregular time basis, as a practical matter, it is difficult to detect and generate the PCI bus connection enable signal at a point of time that the PCI bus enters the idle state. Further hardware logic checks to system idle state should be added to connect the docking system 150 with the base system 100, because it is difficult for the PCI bus idle state detector 120 to generate "dock PCI bus connect enable signal" by using software polling for the very short "idle state" period. Further, the PCI bus idle state checking logic has to include a separate hardware unit for inputting and outputting event information and status information to notify the base system that the docking bus connection has actually been successfully established.

Provided that the base system receives a docking connection event message resulting from a docking connection process from the docking system under the condition that it has no separate unit for inputting and outputting event information and status information, the base system will internally perform a docking configuration-based process by operating systems under the condition that a failure in its docking reprocessing operation occurs when it does not complete the docking bus connection with the docking system.

As described above, the related art base system has various disadvantages. The related art base system must additionally include the PCI bus idle state detection logic, which causes an increase in installation cost. Further, the related art base system still fails to establish the interface and cause the base system hang-up because the base system bus (e.g., PCI bus) status can change after being checked before interface establishment. In addition, not all base system buses are checked by the related art hardware module. Thus, the bus connection is difficult to make because of characteristics of the PCI bus.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a base system for bus connection with a docking system, a method for controlling the same, and a computer-readable storage medium for storing a program for the same that stably docks the docking system to a base system via a bus connection.

Another object of the present invention is to provide a base system for bus connection with a docking system, a method for controlling the same, and a computer-readable storage medium for storing a program for the same that executes a bus cycle in the base system different from that of the docking system.

Another object of the present invention is to provide a base system for bus connection with a docking system, a method for controlling the same, and a computer-readable storage medium for storing a program for the same that controls bus operation of a base system so that bus operations of a docking system are prevented from coming into collision with each other when the docking system is docked to the base system via the bus connection.

Another object of the present invention is to provide a base system for bus connection with a docking system and a method for controlling the same that forces bus cycles of the base system to be fixed at a specific bus cycle for a predetermined period of time so that the docking system can be stably docked to a desired connection bus within the predetermined time period.

Another object of the present invention to provide a base system for bus connection with a docking system and a method for controlling the same that can mount the docking system to the base system via the bus connection at any time while the base system is in use, so that the docking can be conducted more stably than in a warm-docking or cold-docking system with a limited connection time.

In order to achieve at least the above objects in a whole or in part, and in accordance with the present invention, there is provided a system that includes a base system that is configured to connect with a docking system, wherein the base system includes a docking connection controller that detects connection of at least one docking system to the base system and forcibly generates at least one bus operation in the base system different from that of a bus operation used in the docking system for a prescribed period of time, and an interface controller that initiates an interface to a bus of the base system for connection to a bus of the docking system within the prescribed period.

To further achieve at least the above objects in a whole or in part and in accordance with the present invention, there is provided a method for operating a base system that includes detecting attachment to the base system of a docking system, making at least one bus of the base system operate in a prescribed state for a period of time, and enabling in the base system an interface for connection to the docking system within the period of time, wherein the prescribed state of the bus cycle in the base system does not generate a conflict during said enabling the interface for connection to the docking system.

To further achieve at least the above objects in a whole or in part and in accordance with the present invention, there is provided a base system for bus connection with a docking system that includes docking connection processing units for detecting connection of at least one docking system to the base system, generating a bus cycle in the base system different from that of a bus cycle used in the docking system and outputting a docking bus connection enable signal within a period of time for which the bus cycle of the different type is generated, and docking switching units for connecting a bus of the base system to a bus of the docking system in response to the docking bus connection enable signal from the docking connection processing units.

To further achieve at least the above objects in a whole or in part and in accordance with the present invention, there is provided a method for coupling a base system with a docking system that includes generating information regarding a docking bus connection command in response to a docking event signal resulting from a docking connection of the docking system to said base system, executing the docking bus connection command to generate a docking bus connection enable signal, and concurrently generating and maintaining a bus cycle in the base system of a type different from that of a bus cycle used in the docking system, establishing the docking connection with the docking system by performing a switching operation in response to the docking bus connection enable signal while the bus cycle of the different type is generated and maintained, recognizing at least one device in the docking system in response to docking completion acknowledgement information from the docking system, and configuring the base system to indicate accessibility of at least one device in the docking system.

To further achieve at least the above objects in a whole or in part and in accordance with the present invention, there is provided a computer readable medium having computer executable instructions carried thereon, the computer readable instructions includes units for detecting attachment to the base system of a docking system, units for making at least one bus of the base system operate in a prescribed state for a period of time, and units for enabling in the base system an interface for connection to the docking system within the period of time, wherein the prescribed state of the bus cycle in the base system does not generate a conflict during the enabling the interface for connection to the docking system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
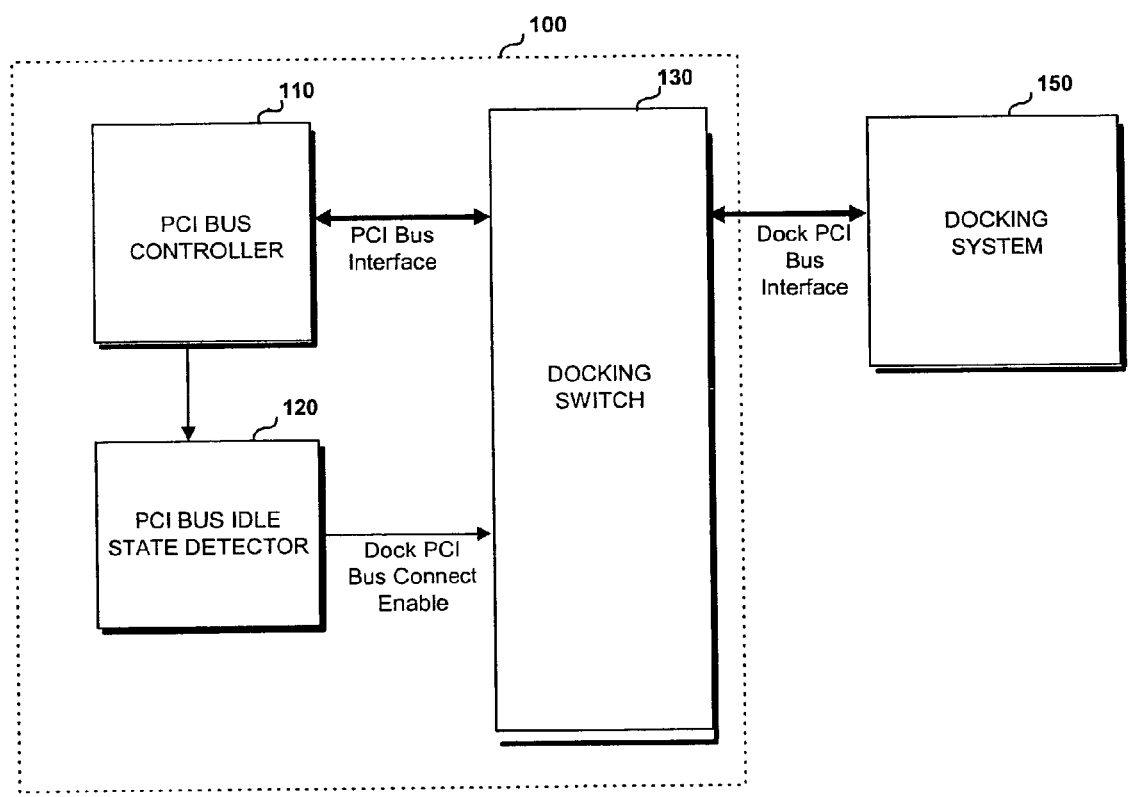
FIG. 1 is a block diagram showing a related art base system for bus connection with a docking system.
Figure 2:
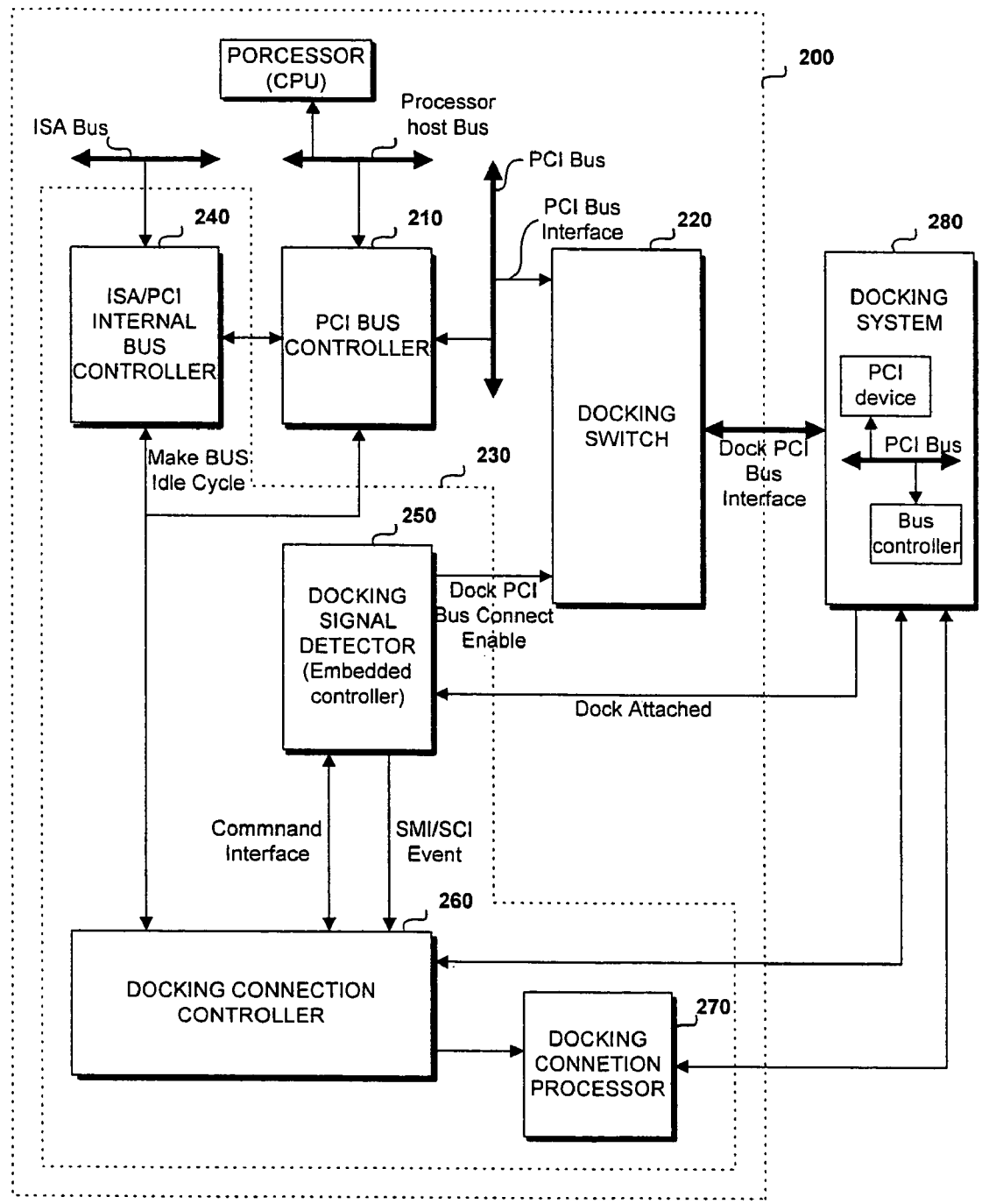
FIG. 2 is a block diagram showing a preferred embodiment of a base system for bus connection with a docking system in accordance with the present invention.

FIG. 2 is a diagram that shows in block form a first preferred embodiment of a base system for bus connection with a docking system in accordance with the present invention. As shown in FIG. 2, a base system 200 for the bus connection with the docking system includes a PCI bus controller 210, a docking switch 220, a docking connection processing unit 230 and an ISA/PCI internal bus controller 240.

The docking connection processing unit 230 includes a docking signal detector 250, a docking connection controller 260 and a docking connection processor 270. The docking signal detector 250 is adapted to detect a physical connection of a docking system 280 to the base system 200, generate an event signal SMI/SCI and provide the generated event signal SMI/SCI to the docking connection controller 260.

The docking connection controller 260 is adapted to recognize the event signal provided from the docking signal detector 250 and perform a docking processing routine based on the bus connection. The docking connection controller 260 sends information regarding a docking bus connection command to the docking signal detector 250 to interface a bus of the docking system 280 with a bus of the base system 200, and then waits until the docking signal detector 250 recognizes the docking bus connection command information. That is, the docking connection controller 260 performs command interface-based communications with the docking signal detector 250 to determine whether the docking signal detector 250 has recognized the docking bus connection command information.

Thereafter, the docking connection controller 260 controls the ISA/PCI internal bus controller 240 to force it to successively generate a bus cycle different from that of the docking system 280 to prevent each device in the base system 200 from colliding with the bus of the docking system 280, and then waits until the docking signal detector 250 processes the docking bus connection command. At this time, 1 msec is required for the docking signal detector 250 to process the docking bus connection command. However, the present invention is not intended to be so limited as required forced bus cycle times can vary based on various criteria.

The docking connection controller 260 preferably forces each base system bus that could conflict such as a CPU host bus, an internal PCI bus, an external PCI bus and an ISA bus into a non-conflicting state that preferably puts the bus controller (e.g., PCI bus controller 210 in an idle state) in a state that reduces or prevents conflict to increase or guarantee successful docking interface establishment. Preferably, the docking connection controller 260 forces the relevant bus controllers to prevent conflict by causing a non-operation cycle for a prescribed period of time. Thus, for example, the CPU preferably operate a non-operation command, and the CPU can operate a command between the CPU and ISA devices, and the CPU and PCI devices to generate an idle cycle for a CPU host bus, a ISA bus and a PCI internal bus, respectively. Otherwise, buses in the base system 200 could switch into a non-idle cycle such as an active or working state and conflict with a non-idle bus cycle in the docking system 280. If the PCI external bus status is not idle, a base system hang-up and/or a failed connection to the docking system 280 can result.

When the bus cycle different from that used in the docking system 280 is provided to the base system 200 under the control of the docking connection controller 260, the docking signal detector 250 generates a docking bus connection enable signal and provides it to the docking switch 220. In response to the docking bus connection enable signal from the docking signal detector 250, the docking switch 220 preferably performs a switching operation using hardware to establish the bus connection between the docking system 280 and the PCI bus controller 210 in the base system 200.

At this time, the base system 200 preferably maintains the bus cycle different from that used in the docking system 280 for a period of time required for the docking switch 220 to establish the bus connection based on the switching operation.

Thereafter, the docking connection controller 260 reads a device ID of a PCI-to-PCI bridge controller or the like in the docking system 280 to determine whether the docking bus of the docking system 280 has made a normal connection to the base system 200. If the device ID of the bridge controller that was read is normal because the bus of the docking system 280 was normally connected, the docking connection controller 260 provides docking completion acknowledgement information, or docking configuration changed information, to the docking connection processor 270.

The docking connection processor 270 preferably recognizes devices in the docking system 280 on the basis of the docking configuration changed information from the docking connection controller 260, and then configures a newly expanded system by exchanging information with the docking system 280.

Figure 3:
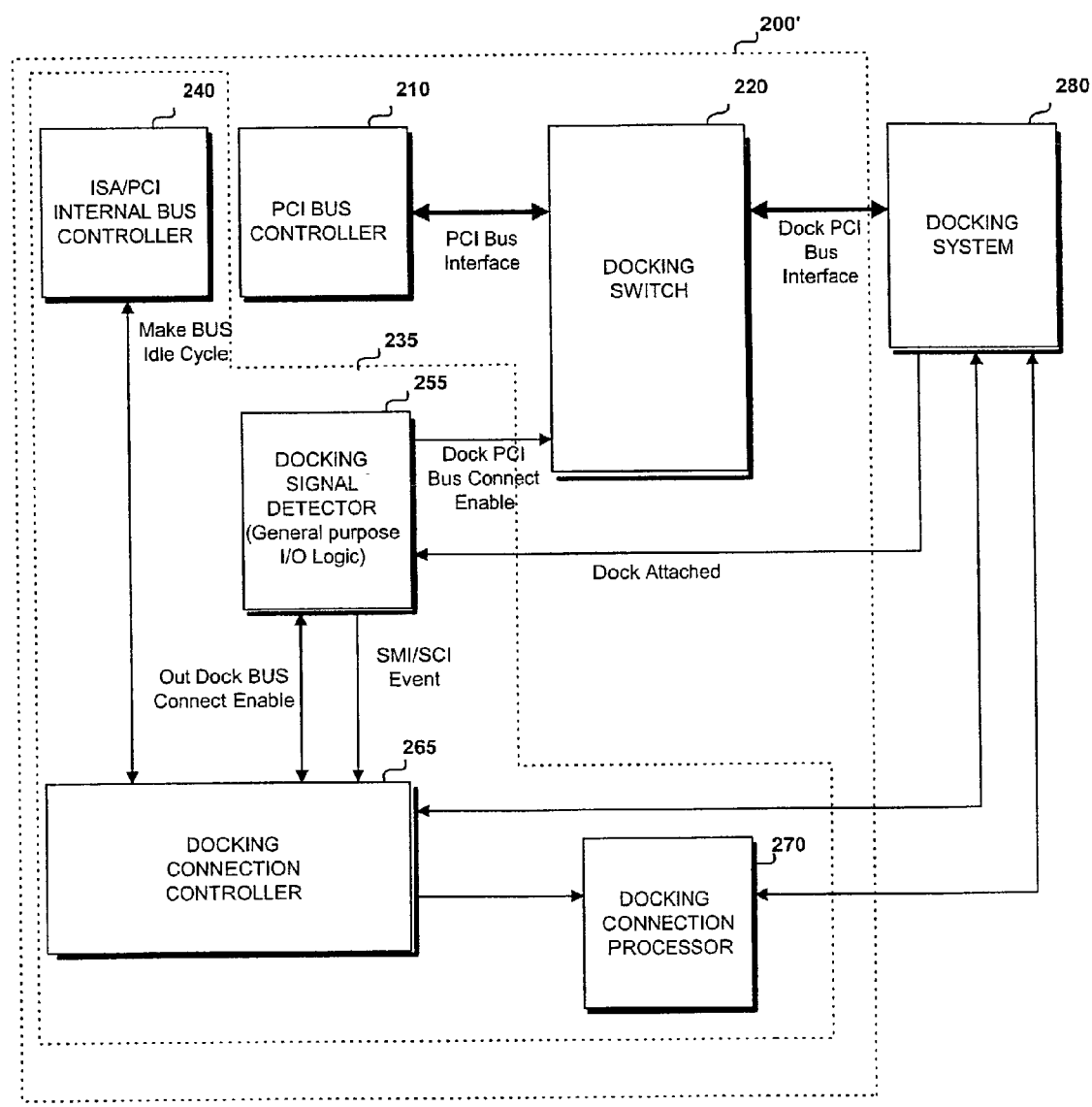
FIG. 3 is a block diagram showing another preferred embodiment of a base system for bus connection with a docking system in accordance with the present invention.

FIG. 3 is a block diagram showing a second preferred embodiment of a base system for bus connection with a docking system in accordance with the present invention. As shown in FIG. 3, a base system 200' for the bus connection with the docking system includes the PCI bus controller 210, the docking switch 220, a docking connection processing unit 235, and the ISA/PCI internal bus controller 240.

The docking connection processing unit 235 includes a docking signal detector 255, a docking connection controller 265, and the docking connection processor 270. The docking signal detector 255 is preferably adapted to detect a physical connection of the docking system 280 to the base system 200', generate an event signal SMI/SCI and provide the generated event signal to the docking connection controller 265.

The docking connection controller 265 is preferably adapted to recognize the event signal SMI/SCI provided from the docking signal detector 255 and perform a bus docking processing routine. The docking connection controller 265 further sends information regarding a docking bus connection command to the docking signal detector 255 to connect a bus of the docking system 280 with a bus of the base system 200'.

That is, in the case where the docking signal detector 255 employs a general-purpose input/output pin, the docking connection controller 265 generates a docking bus connection enable signal and provides it directly to the docking signal detector 255 via the input/output pin, without waiting until the docking signal detector 255 processes the docking bus connection command.

Thereafter, the docking connection controller 265 controls the ISA/PCI internal bus controller 240 to force it to successively generate a bus cycle different from that of the docking system 280 so as to prevent each device in the base system 200' from colliding with the bus of the docking system 280 while the docking signal detector 255 performs an operation corresponding to the docking bus connection enable signal.

When the bus cycle different from that used in the docking system 280 is provided to the base system 200' under the control of the docking connection controller 265, the docking signal detector 255 generates a docking bus connection enable signal and provides it to the docking switch 220. In response to the docking bus connection enable signal from the docking signal detector 255, the docking switch 220 preferably performs a hardware switching operation to establish the bus connection between the docking system 280 and the PCI bus controller 210 in the base system 200'.

At this time, the base system 200' preferably maintains the bus cycle different from that used in the docking system 280 for a period of time required for the docking switch 220 to establish the bus connection based on the switching operation.

Subsequently, the docking connection controller 265 accesses a device ID of a PCI-to-PCI bridge controller in the docking system 280 to determine whether the docking bus of the docking system 280 has been normally connected to the base system 200'. When the accessed device ID of the bridge controller is normal because the bus of the docking system 280 was normally connected, the docking connection controller 265 provides docking completion acknowledgement information, or docking configuration changed information, to the docking connection processor 270.

The docking connection processor 270 recognizes devices in the docking system 280 on the basis of the docking configuration changed information from the docking connection controller 265. The docking connection processor then preferably configures a newly expanded system by exchanging information with the docking system 280.

Figure 4:
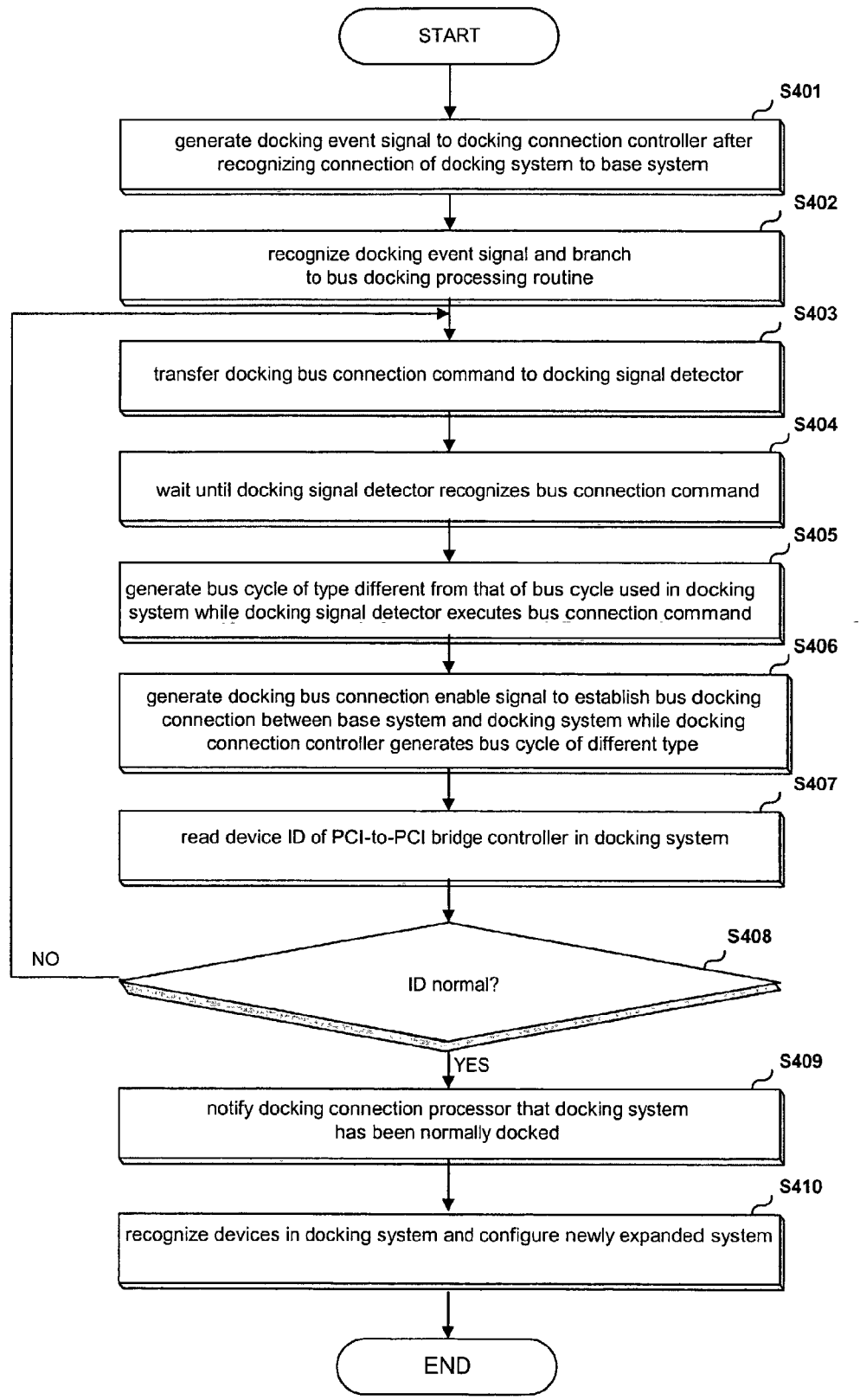
FIG. 4 is a flow chart illustrating a preferred embodiment of a method for controlling the base system for a bus connection with a docking system in accordance with the present invention.

FIG. 4 is a flow chart illustrating a first preferred embodiment of a method for controlling a base system for bus connection to a docking system in accordance with the present invention. The first preferred embodiment of a method for controlling a base system for bus connection to a docking system can be performed, for example, by the base system 200 and will now be described using the base system 200. However, the present invention is not intended to be so limited.

As shown in FIG. 4, after a process starts, upon receiving a docking connection signal resulting from the connection of the docking system 280 to the base system 200, the docking signal detector 250 generates a docking event signal SMI/SCI and provides it to the docking connection controller 260 (step S401).

Then, the docking connection controller 260 recognizes the docking event signal from the docking signal detector 250 and branches to a bus docking processing routine (step S402). The bus docking processing routine preferably controls base system operations to reduce or prevent docking system connection failures. The docking connection controller 260 transfers information regarding a docking bus connection command to the docking signal detector 250 (step S403), and then waits until the docking signal detector 250 recognizes the bus connection command (S404).

While the docking signal detector 250 recognizes and executes the bus connection command, the docking connection controller 260 successively generates an ISA bus cycle or internal PCI bus cycle for the base system 200 by force (step S405). At this time, the generated bus cycle is of a type different from that of a PCI bus cycle used in the docking system 280. As a result, the PCI bus cycle used in the docking system 280 is not generated in the base system 200.

While the docking connection controller 260 generates the bus cycle of the type different from that of the PCI bus cycle used in the docking system 280, the docking signal detector 250 generates a docking bus connection enable signal and provides it to the docking switch 220 (step S406).

In response to the docking bus connection enable signal from the docking signal detector 250, the docking switch 220 performs a switching operation to establish the bus docking connection between the base system 200 and the docking system 280. Thereafter, the docking connection controller 260 reads a device ID of a PCI-to-PCI bridge controller in the docking system (step S407) and then determines whether the read device ID of the bridge controller is normal (step S408).

In the case where it is determined at the step S408 that the read device ID of the PCI-to-PCI bridge controller is not normal, control preferably returns to step S403 where the docking connection controller 260 transfers the docking bus connection command information to the docking signal detector 250, and the bus docking processing routine is repeated. Preferably, the returning to step S403 when the read device ID is not normal is repeated a prescribed number of times such as ten times. If the read device ID is not normal even after returning to step S403 is repeated ten times, the routine is preferably ended and processed as an error.

On the other hand, if it is determined at step S408 that the read device ID of the PCI-to-PCI bridge controller is normal, the docking connection controller 260 notifies the docking connection processor 270 that the docking system 280 has been normally docked (step S409). Accordingly, the docking connection processor 270 recognizes devices in the docking system 280, re-configures the base system as a new system (step S410) and the process is complete.

Figure 5:
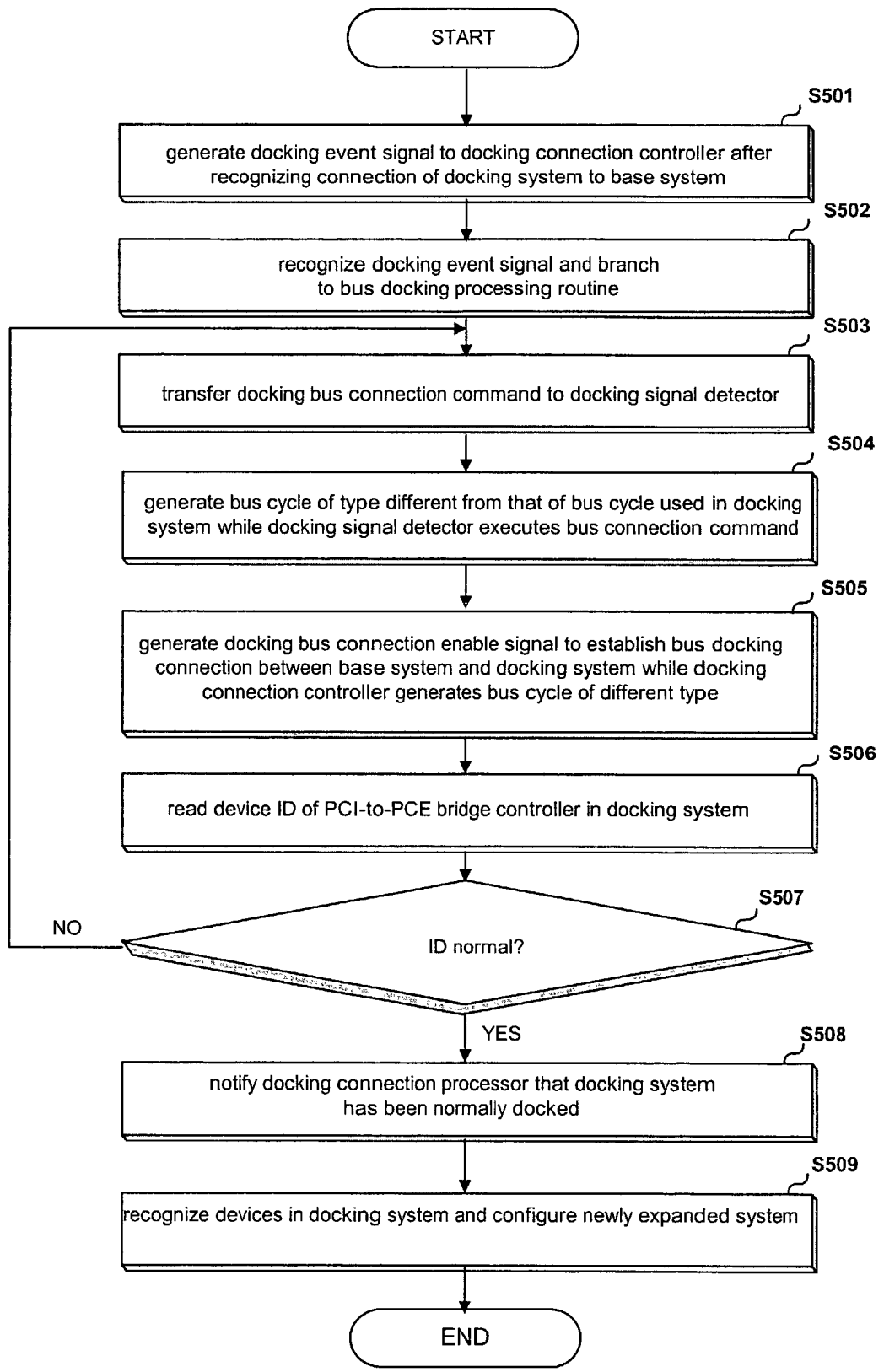
FIG. 5 is a flow chart illustrating another preferred embodiment of a method for controlling a base system for bus connection with a docking system in accordance with the present invention.

FIG. 5 is a flow chart illustrating a second preferred embodiment of a method for controlling a base system for bus connection with a docking system in accordance with the present invention. The second preferred embodiment of a method for controlling a base system for bus connection with a docking system can be performed, for example, by the base system 200' and will be described using the base system 200'. However, the present invention is not intended to be so limited.

As shown in FIG. 5, after a process starts, a docking connection signal is received because of the connection of the docking system 280 to the base system 200'. The docking signal detector 255 preferably receives the docking connection signal and generates a docking event signal SMI/SCI and provides it to the docking connection controller 265 (step S501).

Then, the docking connection controller 265 recognizes the docking event signal from the docking signal detector 255 and branches to a docking processing routine (step S502). The bus docking processing routine preferably controls base system operations to reduce or prevent docking system connection failures. Thereafter, the docking connection controller 265 generates a docking bus connection enable signal and transfers it directly to the docking signal detector 255 via the input/output pin (step S503).

While the docking signal detector 255 executes a docking bus connection command, the docking connection controller 265 successively generates an ISA bus cycle or internal PCI bus cycle for the base system 200' by force. At this time, the generated bus cycle is of a type different from that of a PCI bus cycle used in the docking system 280. As a result, the PCI bus cycle used in the docking system 280 is not generated in the base system 200 (step S504).

While the docking connection controller 265 generates the bus cycle of the type different from that of the PCI bus cycle used in the docking system 280, the docking signal detector 255 generates a docking bus connection enable signal and provides it to the docking switch 220 (step S505).

In response to the docking bus connection enable signal from the docking signal detector 255, the docking switch 220 performs a switching operation to establish the bus connection between the base system 200' and the docking system 280. Thereafter, the docking connection controller 265 reads a device ID of a PCI-to-PCI bridge controller in the docking system (step S506) and then determines whether the read device ID of the bridge controller is normal (step S507).

If it is determined at step S507 that the read device ID of the PCI-to-PCI bridge controller is not normal, control preferably returns to step S503 where the docking connection controller 265 transfers the docking bus connection command information to the docking signal detector 255, and the bus docking routine is repeated.

Preferably, returning to step S503 when the read device ID is not normal is repeated a prescribed number of times such as ten times. If the read device ID is not normal even after returning to step S503 is repeated ten times, the process is preferably ended and handled as an error.

On the other hand, if it is determined at step S507 that the read device ID of the PCI-to-PCI bridge controller is normal, the docking connection controller 265 notifies the docking connection processor 270 that the docking system 280 has been normally connected (step S508). As a result, the docking connection processor 270 recognizes devices in the docking system 280, re-configures the base system as a new system (step S509) and the process is preferably complete.

As described above, according to preferred embodiments of the present invention, a bus cycle collision between the base system and the docking system is avoided by compulsorily generating a bus cycle of a type different from that of a cycle of a bus in the docking system to be connected. Although the bus to be connected has been disclosed in the preferred embodiments to be a PCI bus for illustrative purposes, all types of buses are easily applicable for the bus connection according to the present invention.

As described above, preferred embodiments of a bus docking apparatus and methods of connecting a docking system to a base system and a computer-readable storage medium for storing instructions according to the present invention have various advantages. Preferred embodiments according to the present invention provide a base system for bus connection with a docking system, computer-readable instructions and a method for controlling the same that fixes an internal bus cycle of the base system at a specific bus cycle of a type different from that of a bus cycle used in the docking system for a predetermined period of time preferably during docking operations, which include when a bus of the docking system is connected to a bus of the base system. Therefore, the bus of the docking system can be stably connected to the bus of the base system and docking failures are reduced or prevented. Further, the docking system can be docked to the base system without causing any damage to either system, compared with a related art system having an uncontrolled and limited defined connection point of time.

Further, even if docking system is not a PCI bus, while the base system software such as BIOS consistently staying in the prescribed state are connected with a docking system bus, preferred embodiments of the present invention guarantee or increase safety of the bus connection. Also, preferred embodiments can reduce cost of a base system that uses a standard or legacy system by eliminating additional ASICs or hardware.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system, comprising:
a base system that is configured to connect with a docking system, wherein the base system comprises,
a docking connection controller configured to detect connection of at least one docking system to the base system and forcibly generate at least one bus operation on a bus in the base system different from that of a bus operation on a bus used in the docking system for a prescribed period of time; and
an interface controller configured to establish an interface to said bus of said base system for connection to said bus of said docking system within the prescribed period of time.

2. The system of claim 1, further comprising the docking system, wherein the bus of said base system is a PCI bus or an ISA bus, and wherein the interface is established within the period of time.

3. The system of claim 2, wherein the bus of said docking system is a PCI bus or an ISA bus.

4. The system of claim 2, wherein the bus operation in the docking system occurs in a PCI external bus or an ISA bus, and wherein the bus operation used in the docking system is a non-idle cycle.

5. The system of claim 1, wherein the forcibly generated bus operation in the base system occurs in a CPU internal bus, a PCI internal bus or an ISA bus of the base system, and wherein the generated bus operation is an idle cycle controlled by the docking connection controller.

6. The system of claim 1, wherein the docking connection controller is implemented in software.

7. The system of claim 1, wherein the docking connection controller forcibly generates said at least one bus operation in the base system different from the bus operation used in the docking system by controlling a corresponding bus controller to operate in a prescribed condition for said prescribed period of time.

8. The system of claim 7, wherein said at least one bus is a CPU internal bus, a PCI internal bus and an ISA bus of the base system.

9. A method for operating a base system, comprising:
detecting attachment to the base system of a docking system;
making at least one bus of the base system operate in a prescribed state by forcibly operating a corresponding bus controller in a prescribed condition for a period of time; and
enabling in the base system an interface for connection between said at least one bus of the base system and a bus in the docking system within the period of time, wherein the prescribed state of the bus cycle in the base system does not generate a conflict during said enabling the interface for connection to the docking system during the period of time.

10. The method of claim 9, comprising:
establishing the interface in the base system for connection to the docking system within the period of time;
recognizing at least one device in the docking system based on information received by the base system through the interface; and
reconfiguring the base system to indicate the accessibility by the base system of the recognized at least one device.

11. The method of claim 9, wherein said making step comprises forcing one of a PCI internal bus, a CPU host bus and an ISA bus of the base system operate in an idle state by generating a controlled idle cycle instruction that lasts the period of time so that a PCI external bus is idle state.

12. The method of claim 9, wherein said at least one bus is a plurality of a CPU internal bus, a PCI internal bus and an ISA bus of the base system.

13. A base system for bus connection with a docking system, comprising:
docking connection processing means for detecting connection of at least one docking system to said base system, generating a bus cycle in said base system different from that of a bus cycle used in said docking system and outputting a docking bus connection enable signal within a period of time for which said bus cycle of said different type is generated; and docking switching means for connecting a bus of said base system to a bus of said docking system in response to said docking bus connection enable signal from said docking connection processing means, wherein said docking connection processing means comprises, docking signal detection means for detecting a physical connection of said docking system to said base system, generating a docking event signal and providing said docking bus connection enable signal to said docking switching means, and docking connection control means for generating said bus cycle different from that of said bus cycle used in said docking system responsive to the docking event signal and transferring information regarding a docking bus connection command to said docking signal detection means such that said docking signal detection means generates said docking bus connection enable signal responsive to said information.

14. The base system of claim 13, wherein said docking connection processing means further comprises bus controller means for generating said bus cycle of said type different from that of said bus cycle used in said docking system in response to a cycle generation command from said docking connection control means.

15. The base system of claim 13, further comprising a docking connection processor for recognizing at least one device in said docking system in response to docking completion acknowledgement information from said docking connection processing means.

16. The base system of claim 13, wherein said docking signal detection means is an embedded controller or a general-purpose input/output logic.

17. The base system of claim 13, wherein said docking connection control means is adapted to generate and maintain said bus cycle of said type different from that of said bus cycle used in said docking system for at least a period of time required for the bus connection with said docking system.

18. The base system of claim 13, wherein said base system comprises at least one of a personal digital assistant, mobile telecommunications module, and a portable computer.

19. A method for coupling a base system with a docking system, comprising:

generating information regarding a docking bus connection command in response to a docking event signal resulting from a docking connection of said docking system to said base system;

executing said docking bus connection command to generate a docking bus connection enable signal, and concurrently generating and maintaining a bus cycle in said base system of a type different from that of a bus cycle used in said docking system;

establishing said docking connection with said docking system by performing a switching operation in response to said docking bus connection enable signal while said bus cycle of said different type is generated and maintained;

recognizing at least one device in said docking system in response to docking completion acknowledgement information from said docking system; and configuring the base system to indicate accessibility of at least one device in said docking system.

20. The method as set forth in claim 19, wherein said generating comprises:

generating said docking event signal upon recognizing a physical docking connection of said docking system to said base system;

branching to a bus connection processing routine in response to said docking event signal; and transferring docking bus connection command information from a bus connection processing routine that determines whether said docking bus connection command information has been confirmed.

21. A computer readable medium having computer executable instructions carried thereon, the computer readable instructions comprising:

means for detecting attachment to the base system of a docking system;

means for forcibly making at least one bus of the base system operate in a prescribed state for a period of time by controlling a corresponding bus controller to operate in a non-operation state for said prescribed period of time; and means for enabling in the base system an interface for connection to the docking system within the period of time, wherein the prescribed state of the bus cycle in the base system does not generate a conflict during said enabling the interface for connection to the docking system.

22. A computer readable medium having computer executable instructions carried thereon of claim 21, wherein said at least one bus is a CPU internal bus, a PCI internal bus and an ISA bus of the base system.

23. A system, comprising:

a base system that is configured to connect with a docking system, wherein the base system comprises, a docking connection controller configured to detect connection of at least one docking system to the base system and control at least one bus operation on each of a PCI bus and an additional bus in the base system different from that of a bus operation used in the docking system for a prescribed period of time; and an interface controller configured to establish an interface to the PCI bus of said base system for connection to a PCI bus of said docking system within the prescribed period of time.

24. The system of claim 23, wherein said additional bus of said base system is a CPU internal bus or an ISA bus.

25. The system of claim 24, wherein said additional bus of said base system is said CPU internal bus and said ISA bus.

26. The system of claim 24, wherein the docking connection controller forcibly generates said at least one bus operation on said each of the PCI bus and the additional bus in the base system.

27. The system of claim 26, wherein the docking connection controller forcibly generates said at least one bus operation in the base system different from the bus operation used in the docking system by controlling a corresponding bus controller to operate in a prescribed condition for said prescribed period of time.

28. A method for operating a base system, comprising:

detecting attachment to the base system of a docking system;

making a PCI bus and at least one additional bus of the base system operate in a prescribed state for a period of time; and enabling in the base system an interface for connection between said PCI bus of the base system and a PCI bus of the docking system within the period of time, wherein the prescribed state of the bus cycle in said buses of the base system do not generate a conflict during said enabling the interface for connection to the docking system during the period of time.

29. The method of claim 28, wherein said making said PCI bus and said at least one additional bus of the base system operate in the prescribed state comprises forcibly operating corresponding bus controllers in a prescribed condition for the period of time.

30. The method of claim 28, wherein said at least one additional bus is one or a plurality of a CPU internal bus, a PCI internal bus and an ISA bus of the base system.

31. A system, comprising:
   a base system that is configured to connect with a docking system, wherein the base system comprises,
   a docking connection controller configured to detect connection of at least one docking system to the base system and forcibly generate at least one bus operation in the base system different from that of a bus operation used in the docking system for a prescribed period of time; and
   an interface controller configured to establish an interface to a bus of said base system for connection to a bus of said docking system within the prescribed period, wherein the docking connection controller is implemented in software.

* * * * *